Sept. 10, 1935.  A. O. McCOLLUM  2,014,195
GEAR SHIFTING MECHANISM
Filed Jan. 30, 1933  4 Sheets-Sheet 1
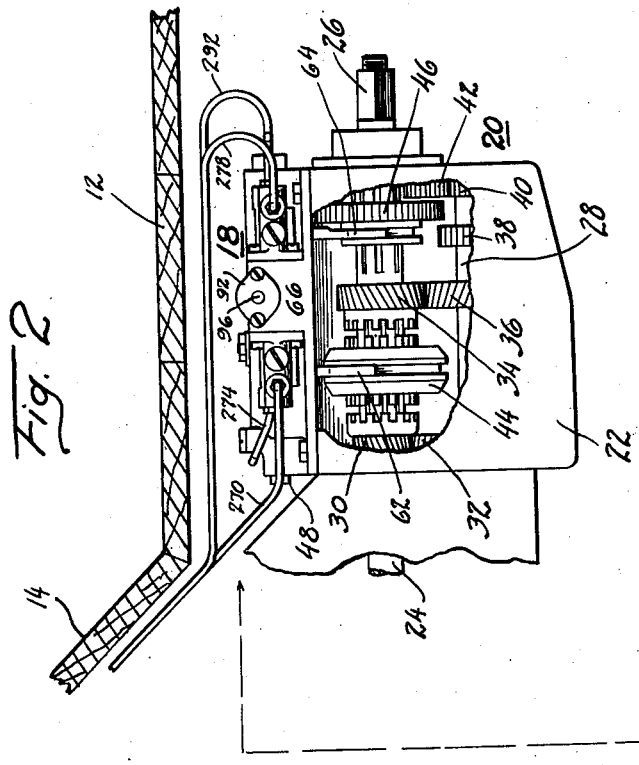
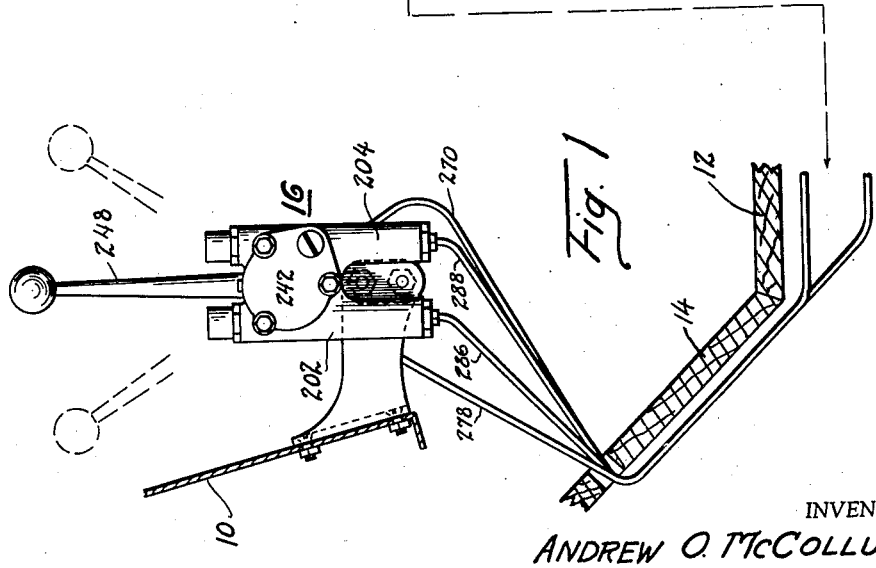
INVENTOR.
ANDREW O. McCOLLUM
BY
ATTORNEY.

Sept. 10, 1935.　　　A. O. McCOLLUM　　　2,014,195
GEAR SHIFTING MECHANISM
Filed Jan. 30, 1933　　　4 Sheets-Sheet 2

INVENTOR.
ANDREW O. McCOLLUM
BY *[signature]*
ATTORNEY.

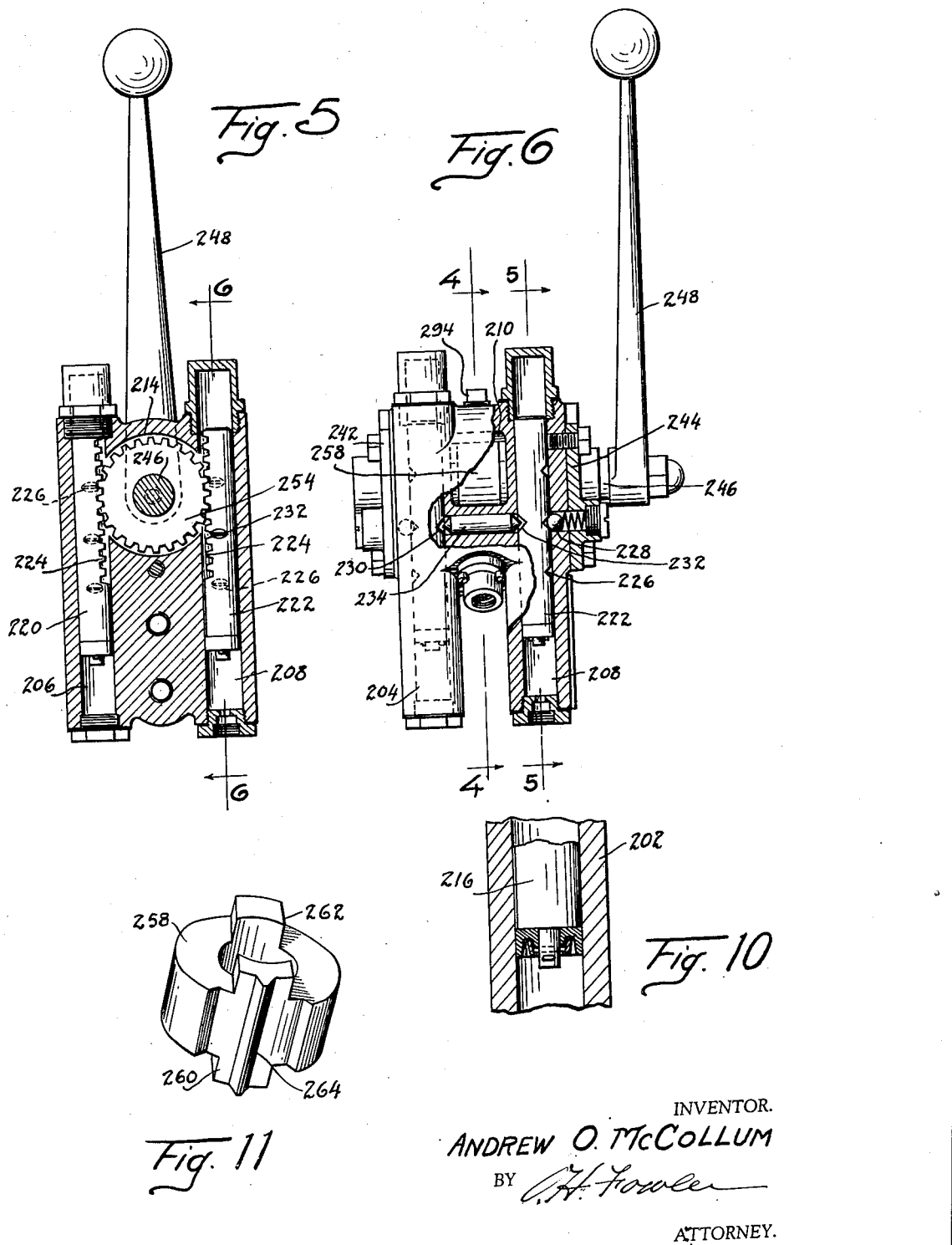

Patented Sept. 10, 1935

2,014,195

UNITED STATES PATENT OFFICE 2,014,195

GEAR SHIFTING MECHANISM

Andrew O. McCollum, Detroit, Mich., assignor to Hydraulic Brake Company, Detroit, Mich., a corporation of California Application January 30, 1933, Serial No. 654,343

10 Claims. (Cl. 60—54.5)

This invention relates to gear shifting mechanisms and more particularly to such mechanisms as are controlled through a remote operating mechanism.

Broadly the invention comprehends a mechanism for shifting the gears of a motor vehicle transmission including a hydraulically operated gear shifting mechanism and a remote hydraulic mechanism for controlling the gear shifting mechanism.

An object of the invention is to provide hydraulic means for shifting gears comprising a manually operated hydraulic mechanism and a hydraulically operated gear shifting mechanism responsive to movements of the manually operated hydraulic mechanism.

Another object of the invention is to provide a positive means for shifting gears smoothly, quietly and without vibrations.

Another object of the invention is to provide hydraulic means for shifting the gears of a motor vehicle transmission in which the component parts shall be simple and inexpensive in structure, highly efficient in use, positive in action, durable in service, and of a general improvement in the art.

Other objects and advantages of the invention will be apparent from the following description taken in connection with the drawings, which form a part of this specification, and in which:—

Figure 1 illustrates a portion of a motor vehicle including an instrument board having thereon a master operating mechanism shown in side elevation.

Figure 2 is an elevation of a motor vehicle transmission with the housing partly broken away to show the gears, their relation to one another, and their relation to a gear shifting mechanism shown in side elevation on the top of the housing.

Figure 5 is a vertical sectional view of the operating mechanism substantially on line 5—5, Figure 6.

Figure 6 is a vertical sectional view of the operating unit partly in section on line 6—6, Figure 5.

Figure 10 is an enlarged detail of a piston in the master operating mechanism, and Figure 11 is an enlarged perspective view of a gear in the master operating mechanism.

Figure 3:
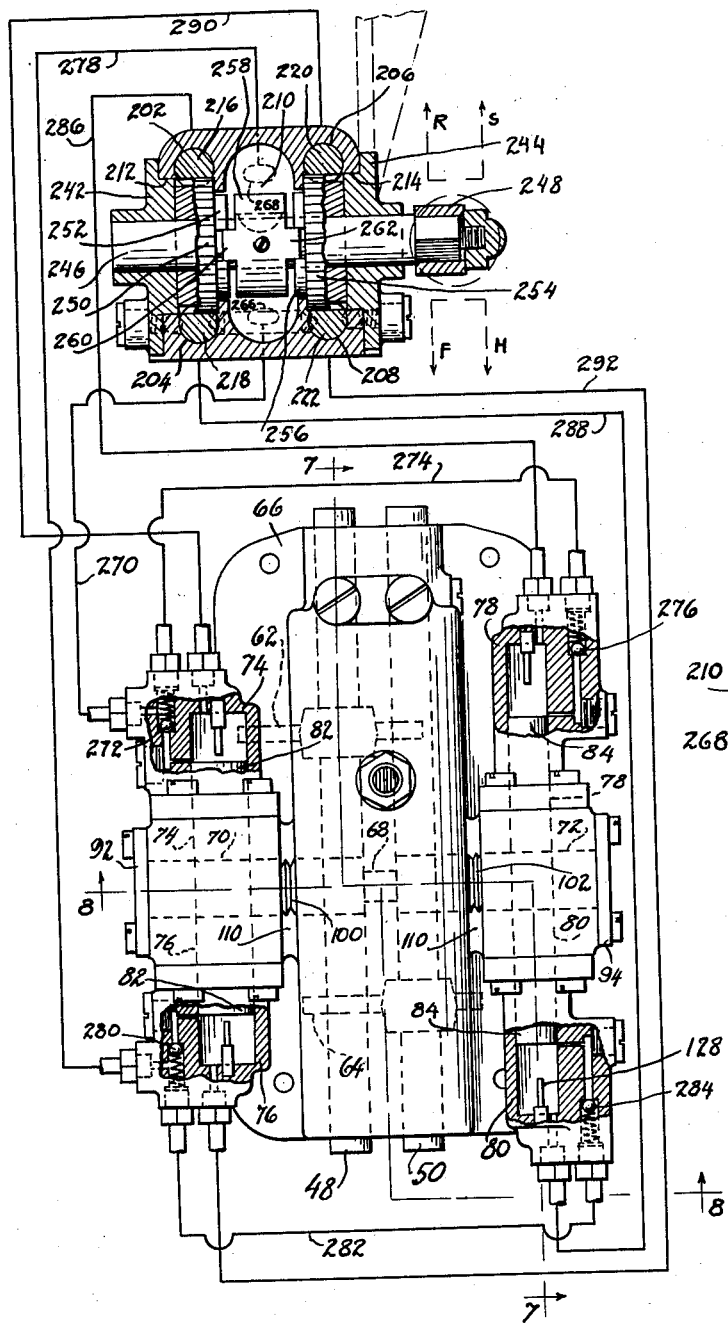
Figure 3 is a diagrammatic illustration of the master operating mechanism and gear shifting mechanism and their connections.
Figure 4:
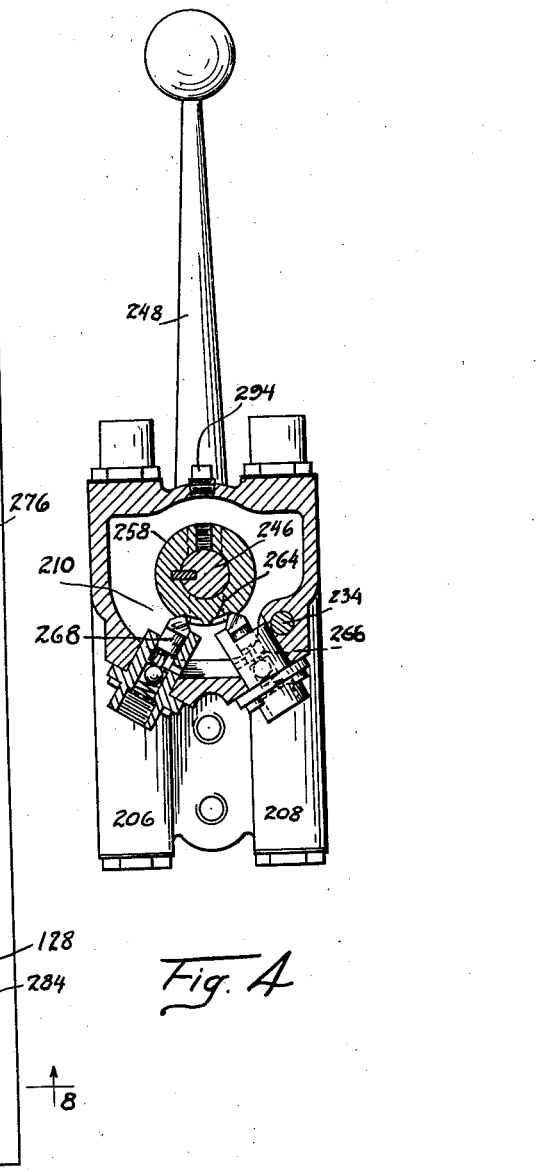
Figure 4 is a vertical sectional view of the operating mechanisms substantially on line 4—4, Figure 6.
Figure 7:
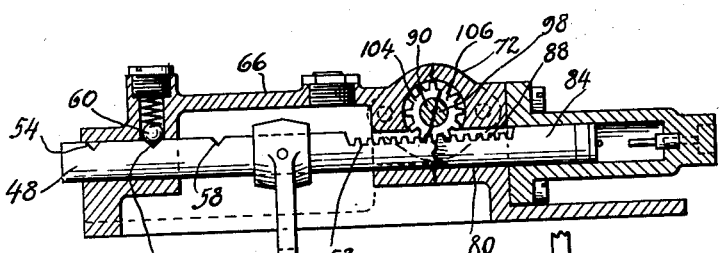
Figure 7 is a vertical sectional view of the gear shifting mechanism substantially on line 7—7, Figure 3.
Figure 8:
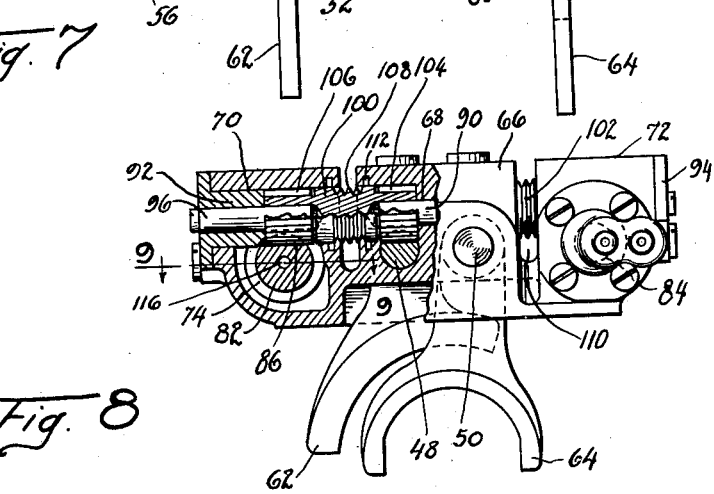
Figure 8 is an elevation of the gear shifting mechanism partly in section, substantially on line 8—8, Figure 3.
Figure 9:
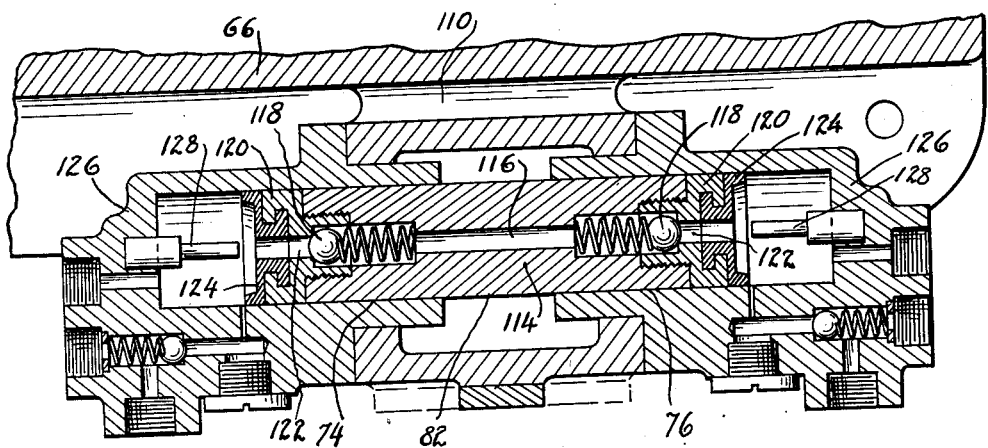
Figure 9 is a plan view of the gear shifting mechanism partly broken away and in section substantially on line 9—9, Figure 8.

Referring to the drawings for more specific details of the invention, 10 represents the instrument board of a motor vehicle and 12 the floor boards of the vehicle including the foot board indicated at 14. The instrument board has secured thereon a master operating mechanism 16 operatively connected to a gear shifting mechanism 18 associated with a transmission 20 positioned beneath the floor boards 12.

The transmission 20, which is of the conventional type, includes a housing 22 having journaled therein a drive shaft 24, a driven shaft 26 and a counter or jack shaft 28. The drive shaft has suitably secured thereto a driving gear 30 in constant mesh with a spur gear 32 formed on or keyed to the counter shaft 28, and rotatably supported on the driven shaft 26 is a spur gear 34 in constant mesh with a spur gear 36 formed on or keyed to the counter shaft 28. The counter shaft also has formed thereon or keyed thereto a spur gear 38, and a spur gear 40 in mesh with a reverse or idler gear 42.

The driven shaft has splined thereon a clutch 44 and a gear 46. The gear 46 may be moved forward to mesh with the spur gear 38 for first speed, or to the rear to engage the reverse spur gear 42 in mesh with the gear 40 on the counter shaft for reverse speed. The clutch 44 may be moved rearward to engage the gear 34, and to lock this gear on the driven shaft for the second speed, or the clutch 44 may be moved forward to engage the driving gear 30 for high speed. The structure thus far described is that of a conventional transmission for a motor vehicle and forms no part of the present invention.

Two rods 48 and 50 are slidably mounted in parallelism in a cover plate on the housing 22. These rods are each provided with a rack 52 and are notched as indicated at 54, 56 and 58 for the reception of a spring-pressed ball 60 for retaining the rods in shifted position. Suitably secured to the rods 48 and 50 are gear shifting members 62 and 64, respectively. The shifting member 62 controls the clutch 44, and the shifting member 64 controls the gear 46.

The cover plate on the housing 22 includes a casting 66 having a transverse bore. As shown, this bore has a central restricted portion 68 and two corresponding end portions 70 and 72 of increased diameter, the latter intercepting the mountings of the rods 48 and 50, respectively. This casting also has supporting members for two sets of opposed cylinders 74, 76, 78 and 80, each set arranged in parallel relation to the shifting rods 48 and 50, respectively, and positioned for reciprocation in the cylinders are double-headed pistons 82 and 84 provided with racks 86 and 88.

The restricted portion 68 of the transverse bore has fitted snugly therein a stub shaft 90, the respective ends of which project co-axially into the corresponding sections 70 and 72 of the transverse bore, and fitted in the outer ends of these sections are plugs 92 and 94 supporting stub shafts 96 and 98 in alignment with the stub shaft 90.

The stub shafts 90, 96 and 98 support for rotation corresponding gear members 100 and 102, each including spaced pinions 104 and 106, and intermediate threaded portions 108. As shown, the pinions 104 are in mesh with the racks on the shifting rods 48 and 50, respectively, and the pistons 106 are in mesh with the racks on the respective pistons 82 and 84, respectively. Thus, upon movement of the piston 82 there is a complementary movement of the shifting rod 48, and correspondingly upon movement of the piston 84 there is a complementary movement of the shifting rod 50.

As shown, the cover plate is slotted as at 110 transversely of the sections 70 and 72 of the transverse bore in a plane intersecting the threaded portions 108 on the gear members 100 and 102, and positioned in the bore sections 70 and 72 adjacent the slots 110 of the bore are grease retaining washers 112. Because of this particular structure, including the threads on the members 100 and 102, the possibility of lubricant passing from the transmission to the gear shifting mechanism is avoided.

The pistons 82 and 84 each include a cylindrical body portion 114 provided with an axial bore 116 having increased diameters at each end thereof for the reception of a spring-pressed ball valve 118 and a head 120, the head having a central opening 122 and a leak-proof cup 124 having a central opening co-extensive with the opening in the head. The opposed cylinders 74, 76, 78 and 80, which are arranged in pairs on the casting, are each provided with a closed head 126 in which is positioned a pin 128 adapted to engage and open the valve in the head of the piston adjacent the respective pins.

The master operating mechanism includes a casting comprising four spaced cylinders 202, 204, 206 and 208. Each of the cylinders is closed at one end as by a cap and a coupling is threaded in the other end thereof. A reservoir 210 is arranged intermediate the cylinders and provided with a filling opening having threaded therein a plug 294. The casting has oppositely disposed openings 212 and 214 communicating with the reservoir. The opening 212 is positioned between and intercepts the cylinders 202 and 204 and the opening 214 is positioned between and intercepts the cylinders 206 and 208.

Pistons 216, 218, 220 and 222 are positioned for reciprocation in the cylinders 202, 204, 206 and 208, respectively. These pistons are fitted with small clearance, or they may be provided with longitudinal grooves extending from the end of the piston to the reservoir, and each piston has upon its head a collapsible leak-proof cup. Because of this structure relief may be had from any excessive pressure in the system due to expansion of the fluid caused by heat, or any decrease in the pressure due to contraction of the fluid caused by low temperature. Formed on each piston is a rack 224, the purpose of which will hereinafter appear, and the pistons are notched as at 226 for the reception of a spring-pressed ball 228 adapted to retain the pistons in shifted position.

The pistons 218 and 222 are notched as at 230 and 232, respectively, for the reception of a slidable pin 234 for locking one of these pistons against movement upon movement of the other. Correspondingly, the pistons 216 and 220 are notched for the reception of a sliding pin for locking one of these pistons against movement upon movement of the other.

The openings 212 and 214 are provided with suitable cover plates 242 and 244. These plates support for reciprocation and rotation a shaft 246 actuated through a hand lever 248. The shaft has sleeved thereon a pinion 250 in mesh with the racks on the pistons 216 and 218, and the pinion has an inwardly extending notched sleeve or flange 252. The shaft also has sleeved thereon a pinion 254 in mesh with the racks on the pistons 220 and 222, and the pinion 254 has an inwardly extending notched sleeve or flange 256.

Keyed on the shaft between the pinions 250 and 254 is a sleeve or collar 258 having lugs 260 and 262 adapted to engage the notches in the respective flanges 252 and 256. The collar 258 also has formed thereon a cam 264 adapted to control valves 266 and 268, positioned in the wall of the reservoir 210.

The valve 266 is connected by a pipe line 270 to a port in the head of the cylinder 74 back of a valve 272 controlling a port in the wall of the cylinder, the valve 272 being connected by a pipe line 274 to a valve 276 in the head of the cylinder 78 controlling a port in the wall of the cylinder.

The valve 268 is connected by a pipe line 278 to a port in the head of the cylinder 76 back of a valve 280 controlling a port in the wall of the cylinder, the valve 280 being connected by a pipe line 282 to a valve 284 controlling a port in the wall of the cylinder 80.

The cylinder 202 is connected by a pipe line 286 to the cylinder 78, the cylinder 204 is connected by a pipe line 288 to the cylinder 80, the cylinder 206 is connected by a pipe line 290 to the cylinder 74, and the cylinder 208 is connected by a pipe line 292 to the cylinder 76.

In operation the system is filled with a suitable hydraulic fluid or liquid and sealed by the plug 294 threaded in the filling opening in the reservoir. Under these conditions, should it be desired to shift the transmission gears to reverse position, the operating lever 248 is manipulated to move the shaft 246 inward to engage the lug 260 on the collar 258 keyed to the shaft with the notch in the hub 252 on the pinion 250, and then in the direction of the arrow indicated "R" to rotate the shaft 246. Rotation of the shaft drives the pinion 250 to move the piston 216 downward in the cylinder 202, and the piston 218 upward in the cylinder 204.

This movement of the piston 216 displaces the fluid in cylinder 202 and imposes pressure on the column of fluid in the pipe line 286, thereby causing pressure in the cylinder 78 resulting in movement of the piston 84, which movement is transmitted through racks and pinions to slide the shifting bar 50 and thereby shift the transmission gears to the reverse position. The fluid or liquid in the cylinder 80 is evacuated through the pipe line 288 into the cylinder 204.

During movement of the operating lever to the position indicated "R", the valve 268 is open and the valve 266 is closed, and at the end of the movement of the operating lever both of these valves are open. This relieves pressure on the pipe lines 278 and 282 and also pressure on the pipe lines 270 and 274, hence in the cylinder 78. At the end of the stroke of the piston 84 a pin 128 in the head of the cylinder opens the valve in the head of the piston and releases any excess fluid in the pipe line 286.

When the operating lever is moved to the neutral position, the piston 216 in the cylinder 202 is moved upward and the piston 218 in the cylinder 204 is moved downward. During this movement the valve 268 remains open. As the pistons move toward the neutral position the fluid in the cylinder 204 is displaced through the pipe line 288 into the cylinder 80, and when neutral position is reached excess fluid is returned to the reservoir 210 through valve 284, the pipe lines 278 and 282, and the valve 268.

Should it be desired to shift the transmission gears to the first forward speed position, the operating lever 248 is manipulated to move the shaft 246 inward to engage the lug 260 on the collar 258 keyed to the shaft with a notch in the hub 252 of the pinion 250, and then moved in the direction of the arrow indicated "F". Whereupon, the shaft 246 is rotated to drive the pinion 250 and thereby moving piston 218 downward in cylinder 204 and piston 216 upward in cylinder 202.

Downward movement of the piston 218 displaces fluid in cylinder 204 and imposes pressure on the column of fluid in the pipe line 288, thereby causing pressure in the cylinder 80 resulting in movement of the piston 84. Movement of the piston 84 is transmitted through racks and pinions to shift the rod 50 to shift the transmission gear to the first speed position. The fluid in the cylinder 78 is evacuated through the pipe line 286 into the cylinder 202.

As the operating lever is moved in the position indicated "F", the valve 266 is opened and the valve 268 is closed, and at the end of the movement of the lever both of these valves are open to release pressure on the pipe lines 278 and 282, also pressure on pipe lines 270 and 274, and hence in cylinder 80. At the end of the stroke of the piston 84, the valve in the operating head of the piston is opened to release any excess fluid in the pipe line 288.

Now, upon movement of the operating lever to the neutral position, the piston 218 in the cylinder 204 is moved upward and the piston 216 in the cylinder 202 is moved downward. During this movement the valve 266 remains open. As the pistons move toward neutral positions, the fluid in the cylinder 202 is displaced through pipe line 286 into cylinder 78, and when neutral position is reached any excess fluid is returned to the reservoir 210 through valve 276, the pipe lines 270 and 274, and valve 266.

When it is desired to shift the transmission gear to the second speed position, the operating lever 248 is manipulated to move the shaft 246 outward to engage the lug 262 on the collar 258 with a notch in the hub 256 of the pinion 254, and then in the direction of the arrow indicated "S" to rotate the shaft and drive the pinion 254 to move the piston 220 downward in cylinder 206 and the piston 222 upward in the cylinder 208.

Downward movement of the piston 220 displaces the fluid in the cylinder 206 and imposes pressure on the column of fluid in the pipe line 290, and hence introduces pressure in cylinder 74 resulting in movement of piston 82. This movement of the piston 82 is transmitted through racks and pinions to slide shifting rod 48 to shift the transmission gears to the second speed position. The fluid in cylinder 76 is evacuated through pipe line 292 into the cylinder 208.

As the operating lever moves to the position indicated "S", the valve 268 is open and valve 266 is closed, and at the end of this movement of the operating lever both of the valves 266 and 268 are open. This relieves pressure of the pipe lines 270 and 278, and also in the cylinder 74. At the end of the stroke of the piston 82 the valve in its operating head is opened to release any excess fluid in the pipe line 290.

Now, upon moving the operating lever to the neutral position, the piston 220 in the cylinder 206 is moved upward and the piston 222 in the cylinder 208 is moved downward. During this movement the valve 268 remains open, and as the pistons move toward neutral position the fluid in cylinder 208 is displaced through pipe line 292 into the cylinder 76, and when neutral position is reached excess fluid is returned to the reservoir 210 through the valve 289, the pipe line 278 and the valve 268.

With the operating lever 248 in neutral position, if it is desired to shift the transmission gears to the third or high speed position, the operating lever is manipulated to move the shaft 246 outward to engage the lug 262 on the collar 258 secured to the shaft with a notch in the hub 256 of the pinion 254. The operating lever is then moved in the direction of the arrow indicated "H" to rotate the shaft 246 and drive the gear 254 to move the piston 222 downward in the cylinder 208 and the piston 220 upward in the cylinder 206.

Downward movement of the piston 222 displaces the fluid in the cylinder 208 and imposes pressure on the column of fluid in the pipe line 292 This causes pressure in the cylinder 76 resulting in movement of the piston 82, and this movement of the piston 82 is transmitted through racks and pinions to slide the shift rod 48 to shift the transmission gears to the third or high speed position. The fluid or liquid in the cylinder 74 is evacuated through the pipe line 290 into the cylinder 206.

During movement of the operating lever to the position indicated "H", the valve 266 is open and the valve 268 is closed, and at the end of this movement of the operating lever both valves are open. This relieves pressure on the pipe lines 270 and 278 and also pressure on the cylinder 76. At the end of the stroke of the piston 82 the valve in the operating head thereof is open to release any excess fluid in the pipe line 292.

When the operating lever is again moved to neutral position, the piston 222 in the cylinder 208 is moved upward and the piston 220 in the cylinder 206 is moved downward. During this movement the valve 266 remains open. As the pistons move toward neutral positions, the fluid in cylinder 206 is displaced through pipe line 290 into cylinder 74, and when neutral position is attained the excess fluid is returned to the reservoir 210 through valve 272, pipe line 270, and valve 266.

While a preferred embodiment of the invention has been described, it is to be understood that this is given merely as an example of the underlying principles of the invention, and since these principles may be incorporated in other specific mechanical structures I do not intend to be limited to the structure shown except where such limitations are clearly imposed by the appended claims.

Having thus described the various features of the invention, what I claim as new and desire to secure by Letters Patent is:—

1. A gear shifting mechanism comprising fluid actuated pistons arranged in parallelism, means connecting the pistons to the shifting elements of the mechanism, a reservoir, fluid pressure means associated therewith for actuating the pistons including an actuator in the reservoir, means for automatically relieving pressure on the pistons at the end of the stroke of the respective pistons, means for returning excess fluid to the reservoir, a control means for the return means, and means carried by the actuator for operating the control means.

2. A gear shifting mechanism comprising cylinders arranged in parallel relation to each other and to the shifting elements of the mechanism, reciprocable pistons in the cylinders, means connecting the pistons to the shifting elements, a reservoir, fluid pressure means associated therewith and connected to the cylinders, an actuator in the reservoir for operating the fluid pressure means, means for returning excess fluid to the reservoir, a valve controlling the return means, and means carried by the actuator for opening the valve.

3. A gear shifting mechanism comprising a pair of cylinders arranged parallel to each other and to the shifting elements of the mechanism, a reciprocable double-headed piston in each of the cylinders, means connecting each piston to the adjacent shifting element, a reservoir, fluid compressors supplied from the reservoir and connected to the respective ends of the cylinders, an actuator in the reservoir for selectively actuating the compressors, means for relieving pressure at the end of the stroke of the respective pistons, means for returning excess fluid to the reservoir, valves for controlling the return means, and means on the actuator controlling the valves.

4. A gear shifting mechanism comprising fluid pressure means including a reservoir having inlets connected to a fluid actuated mechanism, valves controlling the inlets, cylinders arranged in pairs on the reservoir and connected to the actuated mechanism, pistons movable in the cylinders, and means in the reservoir for selectively actuating the pistons in either pair of cylinders including means for actuating the valves.

5. A gear shifting mechanism comprising fluid pressure means including a reservoir having inlets connected to a fluid actuated mechanism, valves controlling the inlets, two pairs of cylinders arranged symmetrically on the reservoir and connected to the fluid actuated mechanism, pistons movable in the cylinders, members connecting the pistons in pairs, a rotatable shiftable element for selectively engaging the members, and means on the rotatable shiftable element for actuating the valves.

6. A gear shifting mechanism comprising a fluid pressure means including a reservoir having inlets connected to a fluid actuated mechanism, valves controlling the inlets, two pairs of cylinders arranged symmetrically on the reservoir and connected to the actuated mechanism, pistons movable in the cylinders, racks on the pistons, gears cooperating with the racks on the pistons in the respective pairs of cylinders, a rotatable axially movable shaft extending coaxially through the gears, means on the shaft within the reservoir for selectively engaging and driving the gears including means for actuating the valves, and hand-operated means for manipulating the shaft.

7. A gear shifting mechanism comprising a fluid actuated piston, means connecting the piston to a shifting element of the mechanism, a reservoir, a fluid pressure control means associated therewith including a pair of movable members, one operable to impose pressure on one end of the piston and the other receding to receive fluid from the other end of the piston, means effective at the end of the piston stroke to relieve pressure on the piston, means in the reservoir for actuating the movable members, means for returning excess fluid to the reservoir, means for controlling the return means, and means carried by the actuating means for operating the control means.

8. A gear shifting mechanism comprising a fluid actuating means including a cylinder and a piston, means connecting the piston to a shifting element of the mechanism, a reservoir, a fluid pressure control means associated therewith including a pair of movable members, fluid pressure delivery pipes connecting the respective members to the ends of the cylinder, said members being operable concomitantly in opposite directions one to impose pressure on one end of the piston and the other receding to receive fluid from the other end of the piston, means effective at the end of the stroke of the piston to relieve pressure thereon including means for by-passing the fluid through the piston, and means for returning excess fluid to the reservoir.

9. A gear shifting mechanism comprising two pair of opposed cylinders arranged in parallel relation one pair on each side of the shifting mechanism, a double head piston reciprocable in each pair of cylinders, means connecting the pistons to the shifting elements of the mechanism, a reservoir, a fluid pressure control means associated therewith including two pair of movable members, fluid pressure delivery pipes connecting the respective pairs of movable members to the respective pairs of cylinders, means for selectively actuating the members in pairs to impose pressure on one end of one of the pistons and relieve pressure on the other end thereof, means effective at the end of the stroke to by-pass fluid through the piston, and means for returning excess fluid to the reservoir.

10. A gear shifting mechanism comprising a fluid actuated piston, means connecting the piston to a shifting element of the mechanism, a reservoir, fluid pressure control means associated therewith including a pair of movable members operable concomitantly in opposite directions, fluid pressure delivery pipes connecting the respective ends of the piston to the respective members so that when fluid is displaced by movement of one of the members to impose pressure on one end of the piston, fluid at the other end of the piston is displaced to the receding member, means effective at the end of the stroke of the piston to relieve pressure on the piston and to by-pass the fluid through the piston to the opposite end thereof and thence to the receding member, and means for returning excess fluid to the reservoir.

ANDREW O. McCOLLUM.